(12) United States Patent
Gravallon et al.

(10) Patent No.: US 11,282,056 B2
(45) Date of Patent: Mar. 22, 2022

(54) METHOD, SERVERS AND SYSTEM FOR DOWNLOADING AN UPDATED PROFILE

(71) Applicant: THALES DIS USA, INC., Austin, TX (US)

(72) Inventors: Sébastien Gravallon, Austin, TX (US); Lionel Rozak-Draicchio, Austin, TX (US)

(73) Assignee: THALES DIS USA, INC., Austin, TX (US)

( * ) Notice: Subject to any disclaimer, the term of this patent is extended or adjusted under 35 U.S.C. 154(b) by 922 days.

(21) Appl. No.: 15/133,787

(22) Filed: Apr. 20, 2016

(65) Prior Publication Data
US 2017/0308881 A1    Oct. 26, 2017

(51) Int. Cl.
| | |
|---|---|
| *H04L 29/08* | (2006.01) |
| *H04W 8/20* | (2009.01) |
| *G06Q 20/20* | (2012.01) |
| *H04L 67/306* | (2022.01) |

(52) U.S. Cl.
CPC ......... *G06Q 20/202* (2013.01); *G06Q 20/206* (2013.01); *H04L 67/306* (2013.01); *H04W 8/205* (2013.01); *G06Q 2220/10* (2013.01)

(58) Field of Classification Search
USPC ........................................... 455/434; 705/18
See application file for complete search history.

(56) References Cited

U.S. PATENT DOCUMENTS

2006/0007870 A1* 1/2006 Roskowski ............ H04L 43/00
370/252
2015/0281942 A1* 10/2015 Lee ...................... H04W 8/205
455/434
2016/0021484 A1* 1/2016 Park ....................... H04W 4/70
455/418

FOREIGN PATENT DOCUMENTS

WO    2017/182402 A1    10/2017

OTHER PUBLICATIONS

GSM Assoication; "Remote Provisioning Architecture for Embedded UICC Technical Specification"; Version 3.1; May 27, 2016; pp. 1-297, http://www.gsma.com/newsroom/wp-content/uploads//SGP.02_v3.1.pdf (Year: 2016).*

(Continued)

*Primary Examiner* — Peter Ludwig
*Assistant Examiner* — Reva R Moore
(74) *Attorney, Agent, or Firm* — Marc Biollot—Thales DIS CPL USA, Inc

(57) ABSTRACT

A method for downloading an updated profile includes a) receiving by a first server an enrolment request with a subscriber identifier, b) receiving by a second server data for provisioning the second server for the subscriber, c) receiving by a third server a command for downloading an updated profile accompanied with the subscriber identifier and an profile identifier, d) sending from the third server to the second server a request for at least one data update accompanied with the subscriber identifier, e) sending from the second server to the third server the data update, f) associating by the third server the data update and a profile, g) sending from the third server to the device or a chip the associated updated profile, i) activating by the device the associated updated profile, and j) sending to the second server a message that the associated updated profile is activated.

9 Claims, 1 Drawing Sheet

(56) References Cited

OTHER PUBLICATIONS

GSM Assoication; "Remote Provisioning Architecture for Embedded UICC Technical Specification"; Version 3.1; May 27, 2016; pp. 1-297.
International Search Report dated Jun. 16, 2017, corresponding to International Patent Application No. PCT/EP2017/059044.
GSM Assoication; "Remote Provisioning Architecture for Embedded UICC Technical Specification", Version 2.1, Nov. 2, 2015. pp. 1-297.

* cited by examiner

METHOD, SERVERS AND SYSTEM FOR DOWNLOADING AN UPDATED PROFILE

FIELD OF THE INVENTION

The invention relates generally to a method for downloading an updated profile.

Furthermore, the invention also pertains to a second server and a third server for downloading an updated profile.

Finally, the invention relates to a system for downloading an updated profile as well.

The present invention is notably applicable to a mobile (radio-communication) field wherein a mobile (tele)phone, as a device, or a chip may be a target of an updated profile to be downloaded. The chip may be either embedded, such as an embedded Universal Integrated Circuit Card (or eUICC) within a device, or removable, such as a chip included within a smart card termed Subscriber Identity Module (or SIM) type card or the like, as a Secure Element (or SE), from a chip host device, like e.g. a mobile phone.

Within the present description, an SE is a smart object that includes a chip that protects access to stored data and is intended to communicate data with an SE host device, like e.g. a mobile phone, a Machine to Machine (or M2M) or an Internet of Things (or IoT) device.

STATE OF THE ART

As known per se, when a mobile operator desires to update a profile with e.g. diversified information, such as a new application and/or subscriber information, an SE downloads firstly the profile from a Subscription Management and Data Preparation (or SM-DP) server, gets from an Over-The-Air (or OTA) server firstly its activation and secondly its update from the OTA server.

However, such a download of a profile update takes more time than the profile download itself and, in a worst case, it may block the subscriber at a Point Of Sale (or POS). There is a huge negative impact on a user experience since the subscriber, as a consumer, has to wait until the profile update is completely downloaded.

Thus, there is a need to provide a solution that allows reducing a time needed to download an updated profile and improving the user experience.

SUMMARY OF THE INVENTION

The invention proposes a solution for downloading an updated profile.

According to the invention, the method comprises the following steps. a) receiving by a first server a message including an enrolment request accompanied with an identifier relating to a subscriber, as a subscriber identifier. b) receiving by a second server data for provisioning the second server for the subscriber. c) receiving by a third server a command for downloading an updated profile accompanied with the subscriber identifier and, as a profile identifier, either an identifier relating to a dedicated profile or an identifier relating to a profile type. d) sending from the third server to the second server a request for getting at least one data update accompanied with the subscriber identifier. e) sending from the second server to the third server the at least one data update. f) associating by the third server the at least one data update and a profile and getting thus an associated updated profile. g) sending from the third server to the device or a chip, as a target, the associated updated profile, the chip being incorporated within or coupled to the device. i) enabling or activating by the device the associated updated profile. And j) sending from the device or the chip, as the target, to the second server a message for informing that the associated updated profile is activated.

The principle of the invention consists in that a subscriber registers directly, i.e. online from a terminal, or indirectly, i.e. through a POS terminal or a device, before a first server by using a subscriber identifier. Then, a second server, like e.g. an OTA type server, gets data for provisioning the second server for the concerned subscriber. A third server, like e.g. an SM-DP type server, gets a command for downloading an updated profile along with the subscriber identifier and a profile identifier. The third server gets, upon its request by using the subscriber identifier, from the second server, a data update(s). The third server associates a profile and the data update(s) and obtains an associated updated profile. The third server transmits to a device or a cooperating chip, as a target, the associated updated profile. The device makes the associated updated profile available for the target. The target transmits to the second server a message for indicating that the associated updated profile is activated.

Within the present description, a profile is a combination of a file structure, data, an application(s) or a subscription(s) to one or several mobile communication services.

It is to be noted that an (associated) updated profile is downloaded and directly activated (or enabled) at a client side, i.e. there is no additional exchange with a server(s), so as to activate a downloaded updated profile.

Contrary to the afore mentioned prior art solution, instead of three operations that imply messages between the client and the server side, namely a download of a profile, a profile activation and a download of a corresponding data update, a download of an updated profile uses a single operation by downloading to a target directly an associated updated profile that is activated locally during a target configuration.

The invention solution needs less messages to be exchanged between a target and the involved server(s) with respect to the afore mentioned prior art solution.

Thus, the invention solution reduces a cost and a time needed to download an updated profile with respect to a cost and a time needed with the afore specified prior art solution.

Such a reduced time needed to download an updated profile mitigates a risk of having an end user who is blocked at a POS.

The invention method is automatically implemented apart for a possible triggering of the invention method by the subscriber, when applicable.

Accordingly, the invention solution allows downloading, in a quick, cheap and efficient manner, an updated profile and enhancing an experience of a user who benefits then from an access to a service(s) rendered available thanks to a thus downloaded updated profile.

According to a further aspect, the invention is a second server for downloading an updated profile.

According to the invention, the second server is configured to receive data for provisioning the second server for a subscriber, receive from a third server a request for getting at least one data update accompanied with an identifier relating to a subscriber, as a subscriber identifier, send to the third server the at least one data update, and receive from a device or a chip, as a target, a message for informing that an associated updated profile is activated, the chip being incorporated within or coupled to the device.

According to still a further aspect, the invention is a third server for downloading an updated profile.

According to the invention, the third server is configured to receive a command for downloading an updated profile accompanied with an identifier relating to a subscriber, as a subscriber identifier, and, as a profile identifier, either an identifier relating to a profile or an identifier relating to a profile type, send to a second server a request for getting at least one data update accompanied with the subscriber identifier, receive from the second server the at least one data update, associate the at least one data update and a profile and get thus an associated updated profile, and send to the device or a chip, as a target, the associated updated profile, the chip being incorporated within or coupled to the device.

According to still a further aspect, the invention is a system for downloading an updated profile.

According to the invention, the system comprises a first server, a second server, a third server and a device. The first server is configured to receive a message including an enrolment request accompanied with an identifier relating to a subscriber, as a subscriber identifier. The second server is configured to receive data for provisioning the second server for the subscriber. The third server is configured to receive a command for downloading or reserving a profile accompanied with the subscriber identifier and, as a profile identifier, either an identifier relating to a profile or an identifier relating to a profile type, send to the second server a request for getting at least one data update accompanied with the subscriber identifier, receive from the second server the at least one data update, associate the at least one data update and a profile and get thus an associated updated profile, and send to the device or a chip, as a target, the associated updated profile, the chip being incorporated within or coupled to the device; and the device is configured to enable or activate the associated updated profile and the device or the chip, as the target, is configured to send to the second server a message for informing that the associated updated profile is activated.

The chip, as a target, may be fixed to, removable from, or mechanically independent from the device.

The chip is preferably included within an SE.

The invention does not impose any constraint as to a kind of the SE type.

As a removable SE, it may be a Subscriber Identity Module (or SIM) type card, a Machine Identification Module (or MIM), a Secure Removable Module (or SRM), a smart dongle of the USB (acronym for "Universal Serial Bus") type, a (micro-) Secure Digital (or SD) type card or a Multi-Media type Card (or MMC) or any format card (or another medium) to be coupled or connected to a chip host device.

As a chip mechanically independent from the device, it may be a wearable device, like e.g. a smart watch or a smart jewel, that exchanges, in a ContacT-Less (or CTL) manner, with the device.

As to the chip host device, it may be constituted by any electronic device, like e.g. a user terminal, a terminal, an M2M device or an IoT device, comprising data processing means, data storing means and one or several Input/Output (or I/O) communication interfaces.

BRIEF DESCRIPTION OF THE DRAWINGS

Additional features and advantages of the invention will be more clearly understandable after reading a detailed description of one preferred embodiment of the invention, given as one indicative and non-limitative example, in conjunction with the following drawings.

DETAILED DESCRIPTION

Herein under is considered an embodiment in which the invention method for downloading an updated profile is implemented notably by a chip, like e.g. an eUICC, as a target and a chip incorporated, possibly in a removable manner, on a Printed Circuit Board (or PCB) of a terminal, as a chip host device.

The chip may incorporate at least part of the terminal component(s), like e.g. a baseband processor, an application processor and/or (an)other electronic component(s).

Alternately, instead of an eUICC, the chip may be a Trusted Execution Environment (or TEE), as a secure area of a terminal processor and a secured runtime environment.

The chip is preferably included within an SE.

The SE may nevertheless have different form factors.

Instead of being embedded within its host device, the chip may be carried by a medium, such as a smart card, a dongle, like e.g. a USB type dongle, or a wearable device, like e.g. a smart watch, a smart jewel or a smart accessory.

According to another embodiment, the invention method for downloading an updated profile is implemented by a terminal, like e.g. a mobile phone, a machine in an M2M or an IoT, as a device, a target and a standalone entity. In other words, the terminal, as a user terminal or a terminal, does not cooperate with any chip, so as to download an updated profile. According to such an embodiment (not represented), the device is adapted to carry out the functions that are carried out by the chip and the chip host device and that are described infra.

Naturally, the herein below described embodiment is only for exemplifying purposes and is not considered to reduce the scope of the invention.

Figure 1:
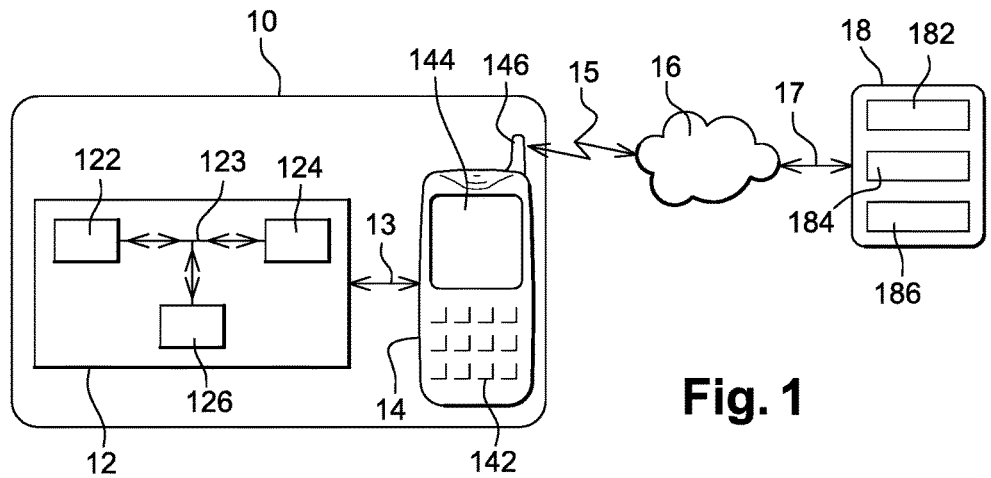
FIG. 1 is a simplified diagram of a terminal equipment, a mobile network and a computer network, the computer network comprising a first, a second and a third server, the terminal equipment comprising a phone and a chip, the terminal equipment and the servers being arranged to download an updated profile, according to the invention.

FIG. 1 shows schematically a Terminal Equipment (or TE) 10, a home (or a visited) mobile network 16 and a computer network 18.

The TE 10 includes a chip 12 and a mobile phone 14, as a user terminal and a chip host device.

For sake of simplicity, the chip 12, the mobile phone 14, the Home mobile Network 16 and the Computer Network 18 are termed infra the SE 12, the host 14, the HN 16 and the CN 18 respectively.

The SE 12 is incorporated within (or coupled to) the host 14, as a terminal or a user terminal.

The CN 18 includes a first server 182, a second server 184 and a third server 186.

For sake of simplicity, the first server 182, the second server 184 and the third server 186 are termed infra the SR1 182, the SR2 184 and the SR3 186 respectively.

The TE 10 is preferably under a radio coverage of the HN 16.

The (user) terminal or a machine in an M2M, as a terminal, may be fixed (i.e. not mobile) or mobile.

The (user) terminal may be a Personal Digital Assistant (or PDA), a vehicle, a POS, an electricity meter, a water meter, a gas meter, any meter, a set-top box, a tablet computer, a Personal Computer (or PC), a desktop computer, a laptop computer, a video player, an audio player, a portable TeleVision (or TV), a media-player, a game console, a netbook, an electronic mobile equipment or accessory (like e.g.: smart glasses, a smart watch or a smart jewel) or an IoT device.

Instead of a phone, the user terminal or the terminal may be any other computer device including means for processing data, comprising (or being connected to) wireless communication means for exchanging data with outside, and comprising (or being connected to) means for storing data.

Within the present description, the adjective "wireless" used within the expression "wireless communication means" denotes notably that the communication means communicates via one or several Long Range (or LR) Radio-Frequency (or RF) links.

The LR RF may be fixed at several hundreds of MHz, for instance, around 850, 900, 1800, 1900 and/or 2100 MHz The host 14 is used for accessing preferably one or several mobile (radio-communication) networks, namely at least the HN 16.

The host 14 may be used for accessing, through the HN 16, the CN 18, the SR1 182, the SR2 184 and the SR3 186.

The host 14, as an SE host device, incorporates the SE 12, is coupled or connected, through a bi-directional link 13, to the SE 12, as a chip embedded within (or coupled to) the host 14.

The SE 12, as a target of an associated updated profile to be downloaded as explained further infra, is under control of a host 14 (micro)processor(s) (or (micro)controller(s)) (not represented), as data processing means.

The SE 12 belongs to a user, as a subscriber to a wireless service(s).

The SE 12 includes a (micro)processor(s) 122, as data processing means, a memory(ies) 124, as data storing means, and one or several I/O interfaces 126 that are internally all connected, through an internal control and data bus 123, to each other.

The I/O interface(s) 126 allow(s) communicating data from the internal SE 12 components to the chip exterior and conversely.

The memory 124 may include one or several Issuer Security Domains (or ISD) and be compliant with the Global Platform (or GP) type standard.

The memory 124 stores an Operating System (or OS).

The memory 124 may store data relating to a Uniform Resource Identifier (or URI), a Uniform Resource Locator (or URL), an Internet Protocol (or IP) address and/or other data relating to an external entity to be addressed, like e.g. a remote server(s) accessible within or through the HN 16 and/or a remote server(s) included within the CN 18.

The memory 124 may store a Mobile Station International Subscriber Directory Number (or MSISDN), an IP Multimedia Private Identity (or IMPI), an IP Multimedia PUblic identity (or IMPU) and/or a Network Access Identifier (or NAI), as an identifier(s) relating to the subscriber.

The memory 124 may store an International Mobile Equipment Identity (or IMEI), a URI, a URL and/or an email address, as an identifier(s) relating to the host 14.

Once an associated updated profile is downloaded as explained further infra, the memory 124 and possibly, more exactly, one or several ISDs store(s) the associated updated profile, namely a profile and one or several data updates.

The data update(s) may include notably:

an application, or termed applet (when written in Java language), for sending to the SR2 184 (and/or (an)other entity(ies)) a message for informing that the associated updated profile is activated;

data for identifying a subscriber;

one or several keys for authenticating the subscriber;

one or several roaming profiles;

one or several applications;

one or several files;

one or several patches relating to the OS;

one or several patches relating to one or several applications that are supported by the SE 12, like e.g. one or several SIM type applications.

The applet, when executed, allows transmitting to the SR2 184 (and/or (an)other entity(ies)) a message for informing that the associated updated profile is activated.

The SIM type application(s) allow(s) the host 14 to identify and authenticate the subscriber to one or several mobile networks, like e.g. the HN 16.

The memory 124 stores, preferably in a secure manner, preferably a plurality of sets of data relating, each, to a subscription, as a wireless service(s).

Each set of data relating to one subscription includes preferably:

an IMSI, as data for identifying a subscriber and a (service) subscription identifier for accessing a mobile network;

a key Ki, as a key for authenticating the subscriber to the network and a Network Authentication Key (or NAK), allowing to authenticate the subscriber to the mobile network;

Milenage (or the like), as a network authentication algorithm, allowing to authenticate the subscriber to the mobile network;

a file system including one or several Elementary Files (or EF);

one or several security keys, like e.g. a key(s) for encrypting/decrypting data and/or a key(s) for signing data a key(s), as secret data; and/or one or several credentials, like e.g. a user name and/or an IDentifier (or ID) of the subscriber, as data relating to the user.

The processor 122 processes, controls and communicates internally data with all the other components incorporated within the SE 12 and, through the I/O interface(s) 126, with the chip exterior.

The processor 122 executes or runs one or several applications, like e.g. once an associated updated profile is downloaded as explained further infra, an application for sending a message for informing that the associated updated profile is activated.

The processor 122 executes, in a preferred manner, one or several security functions, like e.g. a user authentication function through a Personal Identity Number (or PIN), biometric data and/or the like, as user reference data, that is stored, preferably in a secure manner, within the memory 124.

The processor 122 is preferably able to initiate an action(s), in order to interact directly with the outside world, in an independent manner of the host 14. Such a capacity of interaction at the initiative of the SE 12 is also known as being a proactive capacity in which the SE 12 plays a role of a master while the host 14 plays a role of a slave. According to one preferred embodiment, the SE 12 is able to use SIM ToolKit (or STK) type commands, as proactive commands.

The SE 12 is thus able to send, at its own initiative, through the host 14 (to any device, like e.g. a remote server, connected to the host 14) or to the host 14, a message including a proactive command, like e.g. an "Open Channel (or OC) type command", for establishing a connection to an identified server, like e.g. the SR2 184.

Optionally, the host 14 includes a display screen 142 and a keyboard 144, as a Man Machine Interface (or MMI). Alternately, instead of an integrated MMI, the host 14 is connected or coupled to an external MMI.

The host 14 carries out the following operations:

a modulation of an analogical carrier signal to encode digital information to be transmitted, over an antenna 146, to one (or several) network(s) 16; and a demodulation of a received analogical carrier signal to decode the encoded digital information that is received, over the antenna 146, from one (or several) network(s) 16.

The antenna 146 allows communicating data, through a wireless link 15, with the HN 16.

The host 14 includes data processing means, such as one (micro)processor(s) (not represented), data storing means (not represented), as a phone memory, and one or several I/O interfaces connected, through a control and data bus (not represented), to each other.

The host I/O interfaces include one or several I/O interfaces for exchanging data with the SE 12.

Alternatively, instead of being embedded, the SE 12 is comprised within and removable from the host 14.

The host I/O interface with the SE 12 may be an International Organization for Standardization (or ISO) 7816 interface, as a contact interface, when the SE 12 is inserted, possibly in a removable manner, within the host 14.

Alternately, instead of a contact interface, the host I/O interface with the SE 12 is connected to or includes a CTL interface, like e.g. a ISO 14443. The host 14 is connected to or includes means for communicating data while using preferably a Short Range (or SR) RF link. The SR RF link may be related to any technology that allows the host 14 to exchange data, through a so-termed CTL link with the SE 12. The SR RF may be fixed at 13.56 MHz The SR RF may be related to a Near Field Communication (or NFC) type technology, a Bluetooth type technology and/or a Bluetooth low energy type technology, as a CTL technology.

The host memory may comprise one or several memories including one or several volatile memories and one or several non-volatile memories.

The host memory stores, at least in a temporary manner, data relating to an associated updated profile. The data relating to the associated updated profile may include data, like e.g. data that allow(s) configuring an access to an HN 16 and/or (an)other mobile network(s), that is used for configuring the host 14 or the SE 12, as the target.

The host memory may be constituted by one or several EEPROMs (acronym for "Electrically Erasable Programmable Read-Only Memory"), one or several ROMs (acronym for "Read Only Memory"), one or several Flash memories and/or any other memories of different types, like one or several RAMs (acronym for "Random Access Memory").

The host memory stores preferably e.g. an International Mobile Equipment Identity (or IMEI), a URI, a URL and/or an email address, as an identifier(s) relating to the host 14.

The host memory stores an OS and one or several applications.

As application, according to a particular embodiment relating to a user terminal, the host 14 includes a Local Profile Administrator (or LPA), as an application (or an applet) for enabling an associated updated profile to be downloaded to the host 14 or the SE 12, as the target.

The LPA allows:

possibly launching from the host MMI or an external MMI by a user of the host 14;

preferably requesting a download of an associated updated profile;

receiving, from the SR3 186, an associated updated profile;

loading the associated updated profile in a target memory, like e.g. the SE memory or the host 14 memory;

enabling or activating, after a possible previous approval of the user through the host 14 MMI or an MMI connected to the host 14, the associated updated profile by possibly transferring to the SE 12, as the target, the associated updated profile and re-booting the SE 12; and attaching to the HN 16 (and/or (an)other mobile network(s)) by using the thus activated associated updated profile.

To transfer the associated updated profile to the SE 12, as the target, the LPA may convert a protocol, like e.g. an Short Message Service (or SMS) or a Hypertext Transfer Protocol (or HTTP) type protocol, of the received associated updated profile into another protocol, like e.g. using an Application Protocol Data Unit (or APDU), that can be interpreted by the SE 12.

The HN 16 is a home or a visited network. The HN 16 is related to a home or a foreign country with respect to the subscriber. The HN 16 is connected, through a bi-directional link 17, to the CN 18.

The CN 18 comprises or is connected to an Internet type network (not represented). The CN 18 comprises the SR1 182, the SR2 184 and the SR3 186. Each of the SR1 182, the SR2 184 and the SR3 186 is hosted by a computer. The computer includes a processor(s), as data processing means (not represented), comprises and/or is connected to a memory(ies), as data storing means (not represented), and one or several I/O interfaces (not represented).

The host 14, as a device used for launching a download of an updated profile, may be connected, through the HN 16 and the CN 18, to the SR1 182.

Alternately, instead of the host 14, it may be a POS type terminal, a PC or any other computer device, as a device that is different from the host 14 and that is used for launching a download of an associated updated profile, as either the target or the host of a chip, as the target.

The SR1 182 is identified by a URI, a URL, an IP address or the like, as an identifier relating to the SR1 182 or server identifier. The server identifier may be stored within the SE memory 124 or a phone memory.

The SR1 182 may be operated by a mobile radio-communication network operator, as a Mobile Network Operator (or MNO) or a Mobile Virtual Network Operator (or MVNO), a service provider or on its behalf.

The SR1 182 may be included within an ecosystem (not represented), like e.g. a MNO back-end system, that comprises several servers managed by the service provider or on its behalf.

The SR1 182 is dedicated to running an application for managing a first database and communicating data of the first database to outside.

The memory(ies) that is(are) accessible from the SR1 182 stores the first database.

The first database includes a set of an identifier(s) relating, each, to a client device. Each identified client device is associated with data that includes data for provisioning the SR2 184 for the concerned subscriber.

The data for provisioning the SR2 184 for the concerned subscriber includes, besides a subscriber identifier(s), diversified data, like e.g. an IMPI, an IMPU, a roaming file(s), as data for identifying and authenticating to a mobile network(s).

The subscriber identifier(s) may include an MSISDN, a URI, a URL, an IMPI, an IMPU, a NAI and/or one or several identifiers relating to a device, like e.g. an IMEI.

The SR1 182 is configured to receive from a device, like e.g. a POS terminal, an online terminal or a device, such as either a target or a host of a target, a message, such as an SMS type message, including an enrolment request accompanied with or including an identifier relating to a subscriber, like e.g. an MSISDN.

The SR1 182 or another server of a service provider, like e.g. a MNO provisioning server, may be configured to send to the SR2 184 data for provisioning the SR2 184, as data retrieved from the first database, for the concerned subscriber.

The SR2 184 may be an OTA type server, a Trusted Service Manager type server or the like.

The SR2 184 is dedicated to running an application for managing a second database and communicating data of the second database to outside.

The second database includes a set of an identifier(s) relating, each, to a client device associated with data that has been provisioned for the concerned subscriber.

The SR2 184 is configured to receive from a server, like e.g. the SR1 182 or another server, a message including data for provisioning the SR2 184 for an identified subscriber.

The memory(ies) that is(are) accessible from the SR2 184 stores the second database which the SR2 184 updates, each time, data that is received for provisioning the SR2 184 for an identified subscriber.

The SR2 184 is adapted to receive from a server, like e.g. the SR3, a request for getting one or several data updates accompanied with a subscriber identifier, such as an MSISDN.

The SR2 184 is configured to send, as a response to the data update request, the data update(s) that is (or are) previously retrieved from the second database.

The SR2 184 is adapted to receive from a target, like e.g. a host 14 or an SE 12, a message, such as an SMS or HTTP type message, for informing that an associated updated profile is activated.

The SR2 184 may be configured to send to the SR1 182 and/or the target a message for acknowledging receipt of the message (that has been received from the target) for informing that an associated updated profile is activated.

The SR3 186 may be an SM-DP type server, such as an enhanced SM-DP (or termed SM-DP+) server.

The memory(ies) that is(are) accessible from the SR3 186 stores a third database.

The third database includes a set of a profile(s) and/or a set of a profile type(s).

The SR3 186 is dedicated to running an application for managing the third database and downloading an associated updated profile.

The SR3 186 is configured to receive from the SR1 182 or another server, like e.g. a MNO portal or a M2M hub, a message including a command for downloading an updated profile accompanied with or including a subscriber identifier and, as a profile identifier, either an identifier relating to a profile or an identifier relating to a profile type.

The profile identifier(s) may include an Integrated Circuit Card Identifier (or ICCID), a profile type, an IMEI, an IMEI Software Version (or IMEI SV), a Mobile Equipment IDentifier (or MEID), an Electronic Serial Number (or ESN)/User Identity Module IDentifier (or UIMID)/Expanded User Identity Module IDentifier (or EUIMID) and/or an eUICC IDentifier (or eID).

The SR3 186 is adapted to send to the SR2 184 a request for getting one or several data updates accompanied with the subscriber identifier and possibly the profile identifier.

The SR3 186 is configured to receive, as a response to the data update request, from the SR2 184 the data update(s).

According to an essential feature of the invention, the SR3 186 is adapted to associate the data update(s) and a profile, in order to get an associated updated profile. The profile is identified or determined by either the SR1 182 (or another server) when the profile is preferably specific to the target or the SR3 186 when the profile identifier that is provided by the SR1 182 is preferably generic, like e.g. a profile type or a profile category, i.e. that is common to a set of targets.

To associate the (identified) profile and the data update(s), the SR3 186 may carry out the following step(s):

concatenating the data update(s) and the profile;

processing the data update(s) and the profile by removing a piece(s) of duplicate data; and/or processing the data update(s) and the profile by deciphering and/or enciphering the data update(s) and/or the profile.

The SR3 186 may be adapted to receive from a device, like e.g. the host 14, a message, such as an SMS or HTTP type message, including a request for downloading an associated updated profile.

The SR3 186 is configured to send to the device, as a target or an intermediary device to a target, an associated updated profile.

Figure 2:
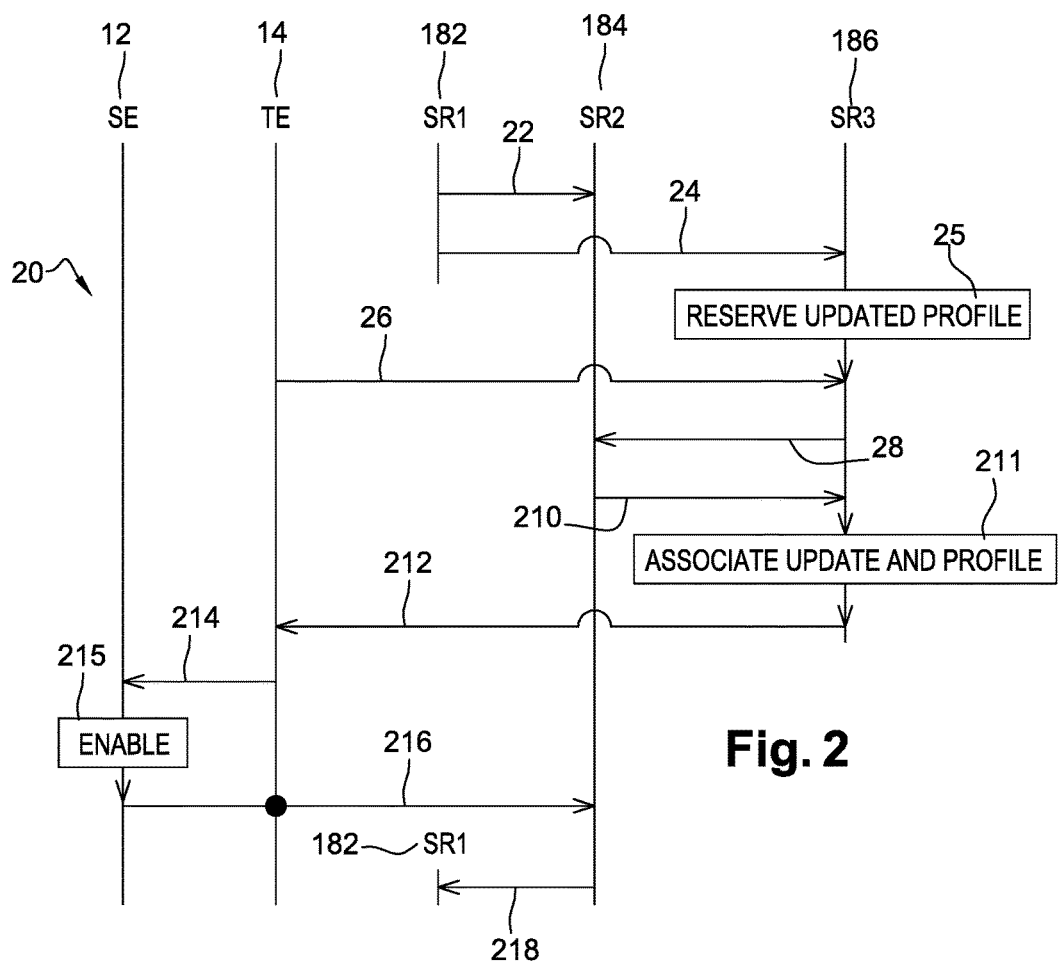
FIG. 2 illustrates an example of a flow of messages exchanged between notably the phone, the chip and the servers of FIG. 1, so that the phone downloads, transfers to the chip, as a target, enables and activates locally an updated profile and then informs the server side about an activation of the updated profile.

FIG. 2 depicts an exemplary embodiment of a message flow 20 involving the SE 12, the host 14, the SR1 182, the SR2 184 and the SR3 186, so as to download to the SE 12, as a target, an associated updated profile in a consumer context.

In another scenario, instead of the SE 12, the phone 14 is the target in a consumer context.

Even if the invention is described in a consumer context, the invention is still applicable in an M2M context in which, instead of being initiated at a client device, like e.g. the host 14, a server, like e.g. the SR3 186, is an initiator of an exchange of messages with the client device.

In the described scenario, it is assumed that the host 14 user, as a subscriber, browses on a host browser and requests online on a server relating to an MNO or the like, as a service provider (or on its behalf), to launch or initiate a download process of an updated profile to the SE 12, as the target.

In another scenario, the subscriber goes into a shop and a person linked to a service provider (or on its behalf) launches a download of an updated profile to the SE 12 (or the host 14), as the target.

Still in another scenario, a user of a smart phone, as a first device, and a smart watch, as a second device that incorporates a chip, as the target, launches a download of an updated profile, through the first device, to the chip.

The SR1 182 receives a message (not represented) including an enrolment request accompanied with or including e.g. an MSISDN, as an identifier relating to the subscriber or a subscriber identifier.

The SR2 184 receives from the SR1 182 (or another server comprised in an ecosystem comprising preferably the SR1 182) a message 22 including data for provisioning the SR2 184 for the subscriber. The message 22 also includes e.g. the MSISDN, as the subscriber identifier. The data for provisioning the SR2 184 for the subscriber includes diversified data, such as data for identifying and authenticating to an IP Multimedia Subsystem (or IMS), one or several roaming files and/or other data. The SR2 184 enters into the second database the received data in association with the identified subscriber.

The SR3 186 receives from the SR1 182 (or another server comprised in an ecosystem comprising preferably the SR1 182) a message 24 including a command for downloading an updated profile that includes or is accompanied with e.g. the MSISDN, as the subscriber identifier, and e.g. an ICCID, as an identifier relating to the profile. Such a profile identifier may be either an identifier relating to a specific or dedicated profile, like e.g. the ICCID, or an identifier relating to a profile type, such as a profile type (number), as an identifier relating to a generic profile.

The message 24 including a command for downloading an updated profile may comprise a GP type command, such as "ES2+DownloadOrder([eID],ProfileType or ICCID)". The message 24 may include an Application Programming Interface (or API), like e.g. "ES2", an identifier relating to the target of the updated profile download, like e.g. "eID", and/or an identifier relating to the profile, like e.g. "ProfileType or ICCID".

The SR3 186 reserves 25 or prepares an updated profile for the concerned subscriber.

Optionally, the host 14 sends to the SR3 186 a message 26 including a request for downloading an updated profile, such as a single command "Get profile" or a first command "InitiateAuthentication" followed by a second command "GetBoundProfilePackage" according to the GSMA standard.

Then, the SR3 186 sends to the SR2 184 a message 28 including a request for getting one or several data updates accompanied with or including e.g. the MSISDN, as the subscriber identifier. The message 28 may include e.g. the ICCID, as the profile identifier.

Instead of receiving the data for provisioning the SR2 184 in the message 22 prior to receiving the message 28, the SR2 184 receives, upon a request (not represented) originating from the SR2 184 for getting data for provisioning the SR2 184 for the concerned subscriber, the data for provisioning the SR2 184 after having received the data update request 28.

Once the SR2 184 has received the data update request 28, the SR2 184, after having retrieved from the second database the data update(s), sends to the SR3 186 the (retrieved) data update(s) 210.

The SR3 186 associates 211 the profile and the data update(s) and gets thus an associated updated profile.

Once the associated updated profile is obtained, the SR3 186 sends to the host 14 one or several messages 212 including the associated updated profile that is possibly previously enciphered.

The host 14, after a possible decipherment of the enciphered associated updated profile, transfers to the SE 12, as the target, one or several messages 214 including the associated updated profile possibly in an enciphered manner.

Once the updated profile is transferred to the SE 12, the SE 12 confirms (not represented) preferably to the host 14 that the updated profile transfer has successfully occurred.

The host 14, and more exactly the LPA, enables the associated updated profile within the target, irrespective of whether the SE 12 or the host 14 is the target.

Optionally, to enable the associated updated profile, the host 14 user approves previously through the host 14 MMI (or an MMI connected to the host 14) such an updated profile enablement operation. Once approved by the user, the host 14 sends to the SE 12 a message (not represented) for launching an enablement of the associated updated profile at the SE 12 side. Such a message for launching an enablement of the associated updated profile at the SE 12 may be a GSMA type command, such as "ES10c+Enable(ISD-P AID or Profile ID)". The message may include an API, like e.g. "ES10c", an identifier relating to the target, like e.g. "ISD-P AID", and/or an identifier relating to the profile, like e.g. "Profile ID".

Only when the target is the SE 12, the SE 12 enables 215 the associated updated profile. Then, the host 14 resets the SE 12, so that the SE 12 attaches to a mobile network with the enabled profile, so as to enable or activate the associated updated profile.

The associated updated profile comprises, within the data update(s), an application for sending to the SR2 184. The SE 12 allows sending, when executing such a downloaded application, to one or several entities the SR2 184 a message 216 for informing that the associated updated profile is activated.

The message 216 for informing that the associated updated profile is activated may comprise a GP type command, such as "/Activated?chip=chipnumber; eID=eIDnumber;ICCID=ICCIDnumber;MSISDN= MSISDN number;deviceIdentifier=IMEInumber". Such a message 216 may include an identifier relating to SE 12, like e.g. the "eIDnumber", as the target, a profile identifier, like e.g. the "ICCIDnumber", a subscriber identifier, like e.g. the "MSISDNnumber", and/or an identifier relating to the subscriber, like e.g. the "MSISDNnumber".

The message 216 may be further signed by the SE 12, so as to prove that the SE 12 is the originator of the sent message 216.

Optionally, the SR2 184 sends to the SR1 182, the SR3 186, the host 14, the SE 12 and/or (an)other entity(ies) a message(s) 218 for acknowledging a receipt of the message 216 for informing that the associated updated profile is activated.

Once an associated updated profile is downloaded to the target, i.e. the SE 12 (or the host 14), the TE 10 user benefits preferably from one or several subscriptions to access a mobile network(s).

The invention solution is compatible with the existing network infrastructure.

The invention solution allows downloading to a target, in a direct, quick, efficient and cheap manner, an associated updated profile.

The invention solution does not need to involve a host user, except for possibly launching an updated profile download, confirming it and submitting user authentication data, when applicable.

The invention solution is therefore transparent to the user (no need of any MMI). Thus, the host user, when applicable, benefits from a good user experience.

The invention claimed is:

1. A computer-implemented method for downloading an updated profile to a device or a chip, as a target, the chip being incorporated within or coupled to the device, wherein the method comprises the following steps:
   a) receiving, by a first server, a message including an enrolment request accompanied with an identifier relating to a subscriber, as a subscriber identifier, the enrolment request including a request to launch or initiate a process for downloading an updated profile to the target;
   b) receiving, from the first server or another server connected to the first server, by a second server, data for provisioning the second server for the subscriber;
   c) receiving, from the first server or another server connected to the first server, by a third server, a command for downloading an updated profile accompanied with the subscriber identifier and, as a profile identifier, either an identifier relating to a dedicated profile or an identifier relating to a profile type;

d) sending, from the third server to the second server, a request for getting at least one data update accompanied with the subscriber identifier;

e) sending, from the second server to the third server, the at least one data update;

f) associating, by the third server, the at least one data update and a profile and getting thus an associated updated profile, the updated profile including the at least one data update;

g) sending, from the third server to the target, the associated updated profile;

h) enabling or activating, by the target the associated updated profile, wherein the associated updated profile corresponds to a file structure, an application, or a service subscription of the target; and i) sending, from the target, to the second server, a message for informing that the associated updated profile is activated, wherein the first server, the second server, and the third server are hardware servers, and wherein the at least one data update includes an application for sending to the second server a message for informing that the associated updated profile is activated.

2. The computer-implemented method according to claim 1, wherein, prior to the step g), the target sends, to the third server, a request for downloading an updated profile.

3. The computer-implemented method according to claim 1, wherein the at least one data update includes at least one element of a group comprising data for identifying a subscriber, at least one key for authenticating the subscriber, at least one roaming profile, at least one application, at least one file, at least one patch relating to an Operating System and at least one patch relating to at least one application supported by the target.

4. The computer-implemented method according to claim 1, wherein the subscriber identifier includes at least one element of a group comprising an MSISDN, a URI, a URL, an IMPI, an IMPU, a NAI and at least one identifier relating to the device and/or wherein the profile identifier includes at least one element of a group comprising an ICCID, a profile Type, an IMEI, an IMEISV, a MELD, an ESN/UIMID/EUMID and an eID.

5. The computer-implemented method according to claim 1, wherein the step f) comprises at least one of the following steps: concatenating the at least one data update and the profile, processing the at least one data update and the profile by removing at least one piece of duplicate data, and processing the at least one data update and the profile by deciphering and/or enciphering the at least one data update and/or the profile.

6. The computer-implemented method according to claim 1, wherein the method further comprises a step in which the second server sends to the first server, the third server and/or the target a message for acknowledging a receipt of the message for informing that the associated updated profile is activated.

7. The computer-implemented method according to claim 1, wherein, the chip, as the target, including at least one Issuer Security Domain, the Issuer Security Domain storing the associated updated profile, the message for informing that the associated updated profile is activated comprises "/Activated?chip=chipnumber; eID=eIDnumber;ICCID=ICCIDnumber;MSISDN=MSISDN number;deviceIdentifier=IMEInumber".

8. The computer-implemented method of claim 1, further comprising:

after receiving the command for downloading the updated profile, and prior to sending the request for getting the at least one data update accompanied with the subscriber identifier, receiving, by the third server and from the target, a request for downloading an updated profile.

9. A system for downloading an updated profile to a device or a chip, as a target, the chip being incorporated within or coupled to the device, wherein, the system comprises a first server, a second server, a third server and the target, the first server being configured to receive a message including an enrolment request accompanied with an identifier relating to a subscriber, as a subscriber identifier, the enrolment request including a request to launch or initiate a process for downloading an updated profile to the target, wherein the first server, the second server, and the third server are hardware servers;

wherein the second server is configured to receive, from the first server or another server connected to the first server, data for provisioning the second server for the subscriber;

wherein the third server is configured to:

receive, from the first server or another server connected to the first server, a command for downloading or reserving a profile accompanied with the subscriber identifier and, as a profile identifier, either an identifier relating to a profile or an identifier relating to a profile type;

send, to the second server, a request for getting at least one data update accompanied with the subscriber identifier;

receive, from the second server, the at least one data update;

associate the at least one data update and a profile and get thus an associated updated profile, the updated profile including the at least one data update; and send, to the target, the associated updated profile; and wherein the target is configured to enable or activate the associated updated profile, wherein the associated updated profile corresponds to a file structure, an application, or a service subscription of the target;

wherein the target, is configured to send, to the second server, a message for informing that the associated updated profile is activated; and wherein the at least one data update includes an application for sending to the second server a message for informing that the associated updated profile is activated.

* * * * *